March 7, 1950     E. L. D'OUVILLE     2,499,372
MANUFACTURE OF HYDROCARBONS
Filed March 9, 1946
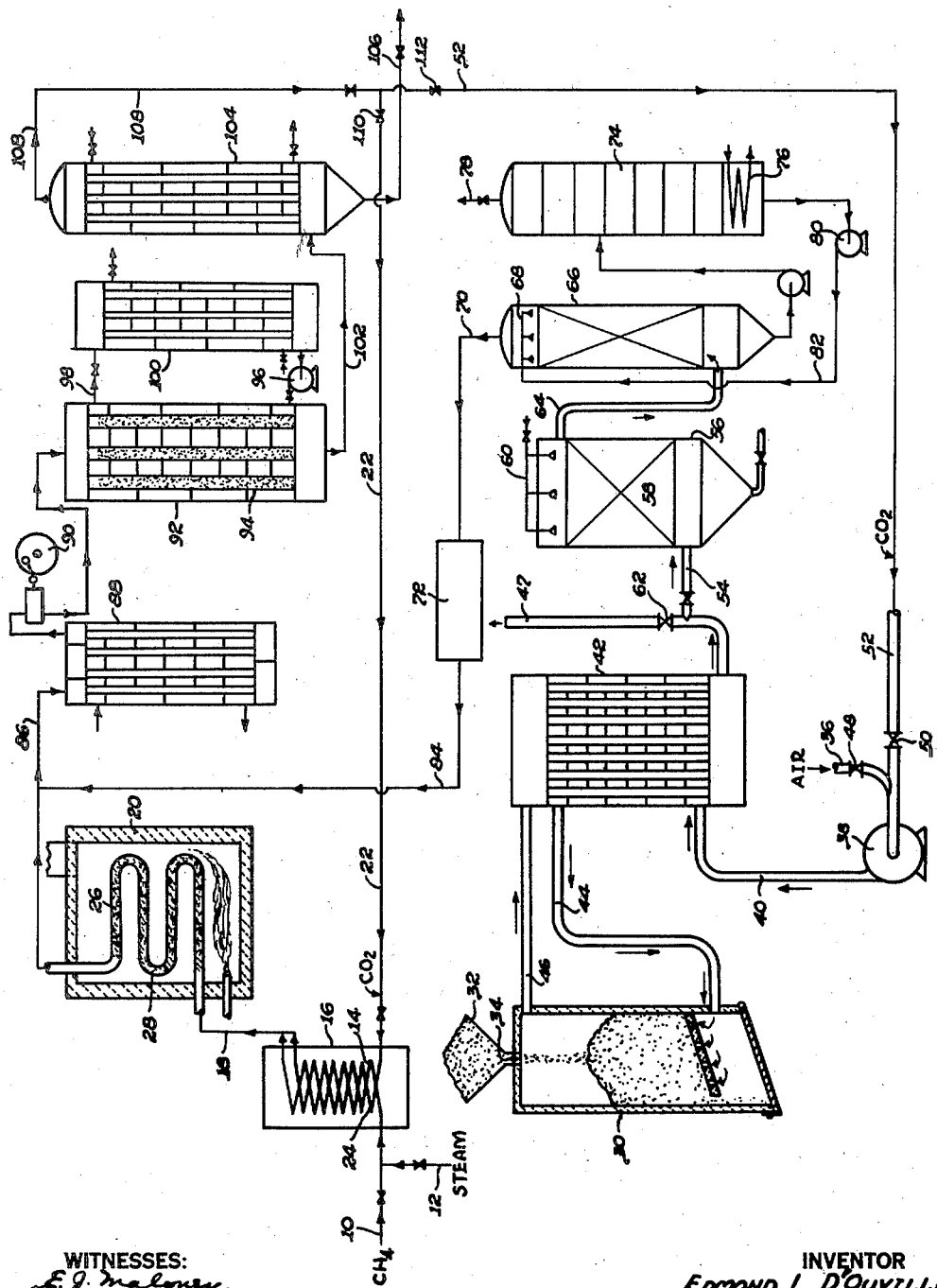
WITNESSES:
INVENTOR
EDMOND L. D'OUVILLE
his ATTORNEY

UNITED STATES PATENT OFFICE 2,499,372

MANUFACTURE OF HYDROCARBONS

Edmond L. d'Ouville, Chicago, Ill., assignor to Koppers Company, Inc., Pittsburgh, Pa., a corporation of Delaware Application March 9, 1946, Serial No. 653,406

7 Claims. (Cl. 260—449.6)

This invention relates to the manufacture of liquid hydrocarbons. More particularly the invention relates to the manufacture of liquid hydrocarbons by the hydrogenation of carbon monoxide wherein the hydrogen and carbon monoxide are produced from methane and solid carbonaceous materials such as coke and coal.

In the well known Fischer-Tropsch process of hydrogenating carbon monoxide to produce hydrocarbons, it has been proposed to use methane in the manufacture of the synthesis gas used in the production of hydrocarbons. Coke is used in the well known water gas reaction for the production of hydrogen and carbon monoxide in making a synthesis gas. However, by using a balanced preparation of methane and coke in the manner hereinafter described higher yields of the liquid product could be obtained than is possible using either coke or methane alone. The various types of synthesis gases and catalysts produce different types of hydrocarbons in the Fischer-Tropsch process, but in all of them there is produced besides liquid hydrocarbons comparatively large volumes of normally gaseous products, including methane, carbon dioxide and substantial amounts of water. In processes commonly used the hydrogen rejected as water is lost even when there is a deficiency of hydrogen in the raw material as is the case with coal or coke. Likewise, the proportions of $CO_2$ produced have been insufficient to supply the carbon deficiency in processes using methane even when the total carbon dioxide produced is recycled.

Methane and coke or coal are very abundant and cheap raw materials which may be used in the hydrocarbon synthesis, particularly if a high and efficient conversion is obtained.

The primary object of the present invention is to provide a process by which substantially only liquid hydrocarbons will be produced in the catalytic hydrogenation of carbon monoxide produced from coke and methane.

Another object of the invention is to provide a process by which the gases, residue or exhaust products of the catalytic conversion may be used in the manufacture of synthesis gases for the catalytic hydrogenation of carbon monoxide.

A further object of the invention is to provide a process in which the synthesis gases for the catalytic hydrogenation of carbon monoxide are produced from methane and coke.

Another object of my invention is to provide an integrated process which conserves raw material and produces liquid fuels of high octane number.

A further object is to reduce to a minimum the production of oxygenated products containing hydrogen. Still another object is to produce liquid olefinic hydrocarbons in the gasoline boiling range.

With these and other objects in view the invention consists in the improved process of manufacture of liquid hydrocarbons hereinafter described and particularly defined in the claims.

The preferred process of the present invention may be carried out in the apparatus illustrated in the accompanying drawing which is a diagrammatic flow sheet of the various parts of the apparatus.

Four fundamental chemical reactions are involved in providing the synthesis gases which are used for the catalytic production of hydrocarbons in the hydrogenation of carbon monoxide according to the present invention. For example, methane will react with water according to the following equation:

$$CH_4 + H_2O = CO + 3H_2$$

Carbon dioxide will react with methane according to the following equation:

$$4CH_4 + 4CO_2 = 8H_2 + 8CO$$

Carbon dioxide will react with carbon in accordance with the following equation:

$$C + CO_2 = 2CO$$

By means of my invention it is possible to accomplish indirectly the net conversion represented by the equation:

$$nC + nCH_4 = C_{2n}H_{4n}$$

This equation shows that it is possible to produce substantially only hydrocarbons of more than one carbon atom from $CH_4$ and C.

In accordance with the present invention carbon monoxide and hydrogen are passed into catalytic contact with an iron catalyst (preferably a sintered iron catalyst) at a temperature between 300° and 350° C. at a pressure between 10 and 50 atmospheres with a space velocity of 300 to 5000 volumes of synthesis gas per volume of catalyst per hour. The synthesis gas preferably is made up of carbon monoxide and hydrogen in the ratio of 4CO to $3H_2$ but the gas ratios may be 2CO to $1H_2$ or 1CO to $1H_2$. I have found that a final synthesis gas which contains carbon monoxide to hydrogen in a ratio not greater than 1 to 0.65 or not less than 1 to 1 will produce a residue gas when the carbon monoxide is hydrogenated in accordance with the conditions outlined above, which has the desired carbon dioxide content so that it may be used for the production of two synthesis gases, one by the reaction of residue gas with methane and steam and the other by the reaction of the residue gas with coke, to form two synthesis gases which when mixed will provide the final synthesis gas described above. In the catalytic conversion besides liquid hydrocarbons a residue gas is formed, the gas having the following components:

| | Per cent |
|---|---|
| $H_2$ | 5 to 10 |
| CO | 5 to 10 |
| $CO_2$ | 40 to 65 |
| Methane | 8 to 25 |

This residue gas forms an important source of raw material from which to produce the gases used in the hydrocarbon synthesis. For example, one portion of this gas may be passed into a converter with additional methane and a very small amount of steam and heated to a temperature of approximately 1000° C. in contact with a metallic nickel catalyst to produce the following synthesis gas:

| | Per cent |
|---|---|
| CO | 40 to 50 |
| $H_2$ | 40 to 65 |
| $CH_4$ | 2 to 10 |

If the second portion or residue tail gas from the synthesis is passed through a hot coke bed at a temperature of 1000° to 1400° C. and at 1 to 2 atmospheres pressure, a synthesis gas will be formed having the following composition:

| | Per cent |
|---|---|
| CO | 70 to 90 |
| $CO_2$ | 1 to 5 |
| $CH_4$ | 5 to 12 |
| $H_2$ | 3 to 5 |

In order to provide a synthesis gas having the proper composition to be catalyzed into liquid hydrocarbons the synthesis gas resulting from the methane conversion and the coke conversion should be blended to give a gas within the following range of composition:

| | Per cent |
|---|---|
| CO | 40 to 60 |
| $H_2$ | 30 to 50 |
| $CH_4$ | 1 to 5 |
| $CO_2$ | 1 to 2 |

If this mixed synthesis gas is catalytically converted at a pressure of 10 to 50 atmospheres, or preferably 300 lbs. per square inch, at a temperature of 300 to 350° (preferably 320° C.), and a space velocity of 300 to 5000 volumes per volume of catalyst per hour, (preferably a space velocity of 500 volumes per volume of catalyst per hour), desirable hydrocarbons will be produced along with a tail gas having approximately the required composition and volume from which to produce the synthesis gas. For example, 16 parts of carbon monoxide and 8 parts of hydrogen ($H_2$) when catalyzed with sintered iron at 350° C., will produce an olefinic hydrocarbon having an average of 8 carbon atoms and 6 to 8 parts of carbon dioxide will be produced. In this process 70 to 90% of the carbon monoxide will be converted, and the remaining hydrogen and carbon monoxide will not be lost to the process because all of the residue gas is returned to gasification means along with the $CO_2$ and utilized in making the synthesis gas for the hydrocarbon conversion.

The above-described process may be carried out in the apparatus illustrated in the drawing as follows:

Methane is introduced through a line 10 and mixed with a small amount of steam introduced through the line 12. The mixture of steam and methane passes through a coil 14 in a furnace 16 and flows to a line 18 entering the lower portion of a catalytic converter 20. Residue gas from a gas separator 104 is introduced through a line 22 into a coil 24 in the furnace 16 and flows into the line 18 for mixture with the preheated methane. The methane and residue gas composed principally of carbon dioxide enter the catalytic converter at a temperature of approximately 800° to 1000° C. and come directly into contact with a bed of catalyst 26 packed in externally heated tubes 28 in the converter furnace. The catalyst is composed of granular Alundum or corundum which is impregnated with metallic nickel. The preheating of the gases will supply part of the heat necessary for the endothermic reaction in the converter tubes 28, but the reaction is controlled by externally heating the tubes. A gas composed of carbon monoxide 40 to 50%, hydrogen 40 to 65%, and methane 2 to 10%, is formed as explained above. The methane should be free from sulphur and if it is not free of sulphur, it should be rendered so by passing it through a potassium carbonate scrubber of the type later to be described. In making the synthesis gas from methane, approximately one half of the residue gas from the converter is utilized.

The remaining half of the residue gas is reacted with coke in a producer 30 to form the second portion of the synthesis gas. To accomplish this, coke from a hopper 32 is introduced through a rotary gate 34 into the producer 30. The manufacture of the synthesis gas involves an endothermic reaction so that the coke bed must be heated to provide the necessary heat for the thermal reaction. To accomplish this, air is introduced through a line 36 into a blower 38 and forced through a line 40 into a recuperator 42. The air passing through the recuperator is preheated to a temperature of approximately 600° to 1200° C. and flows from the recuperator through a line 44 into the bottom of the producer 30. The preheated air passes upwardly through the coke bed to preheat the coke and flows through a line 46 into the top of the recuperator 42. The heated products of combustion pass downwardly through the recuperator to furnish heat for preheating the air then flow out through an exhaust line 47. When the coke bed has reached a temperature of 1200° to 1800° C., a valve 48 in the air line 36 is closed and a valve 50 in a residue gas line 52 is opened to draw in residue gas from the catalytic converter. The residue gas is forced by means of the blower 38 through the recuperator 42 and then through the coke bed in the furnace 30. In the furnace 30 the carbon dioxide residue gas is converted principally into carbon monoxide and flows out through the line 46 into the top of the recuperator 42. The gas is cooled in the recuperator and flows through a line 54 into a water scrubber 56 in which it flows upwardly through a bed of refractory filling 58 in contact with water which is flowing downwardly through the filling, the water being introduced through a series of spray nozzles 60. At the time that the gas passes into the scrubber 56, a valve 62 in the exhaust line 47 is closed. The water scrubber acts to remove sulphur dioxide and dust with a small amount of hydrogen sulphide. The scrubbed and cooled gas from the scrubber 56 flows through a line 64 into the bottom of a potassium carbonate scrubber 66 and passes upwardly through a bed of filling material which is wetted by potassium carbonate solution introduced through a series of nozzles 68. Potassium carbonate solution takes out principally carbon dioxide and some hydrogen sulphide. The main sulphur compounds $H_2S$ and organic sulphur, may be removed by passing the gas from the scrubber 66 through a line 70 into contact with a mixture of approximately 70% iron oxide and 30% soda ash in a purifier box 72. The gas leaving the purifier box 72 will have a composition of:

| | Per cent |
|---|---|
| CO | 70 to 90 |
| $CO_2$ | 0 to 0.5 |
| $CH_4$ | 5 to 12 |
| $H_2$ | 3 to 6 |

Potassium carbonate solution reaching the bottom of the scrubber 66 is pumped into the upper portion of an actifying tower 74 wherein it is heated by a steam coil 76 to drive off the sulphur compounds and carbon dioxide which exhaust through an outlet 78 at the top of the actifier. The revivified potassium carbonate solution from the bottom of the tower is withdrawn by means of a pump 80 and forced through a line 82 into the distributor 68 at the top of the scrubber 66.

The synthesis gas made from coke passes from the purifier 72 through a line 84 to a line 86 where it is mixed with the synthesis gas made from methane and flows from the methane converter 20 into the line 86. The mixture of synthesis gas flows from the line 86 into a cooler and drier 88. This mixture of gas passes through a coil in the interchanger and is cooled by means of water or air which flows through the interchanger around the tubes. The mixture of synthesis gases is forced by means of a compressor 90 through a converter 92. The catalyst for conversion preferably consists of sintered iron containing activators such as $ThO_2$, CaO and Cu is placed in a series of tubes 94 positioned within the converter 92. The hydrogenation of carbon monoxide is an exothermic reaction so that the temperature must be accurately controlled. To accomplish this Dowtherm is introduced into the converter 92 to circulate through the space around the tubes by means of a pump 96. The Dowtherm is withdrawn from the converter 92 through a valved line 98 and passed through a cooler 100 and then returned to the pump 96. Preferably a temperature control (not shown) is provided for the pump motor in order to maintain the desired temperature in the converter.

The hydrogenated converted products pass from the converter 92 through a line 102 into a condenser and gas separator 104 which preferably is water cooled. The liquid hydrocarbons are withdrawn from the bottom of the condenser through a line 106 and the residue or waste gases pass out of the top of the separator 104 through a line 108 which is connected respectively with the lines 22 and 52. Valves 110 and 112 are mounted in the lines 22 and 52 respectively by which the proportion of waste gases being supplied to the methane and coke converters may be accurately controlled.

It will be understood that in order to continuously operate the coke converter it will be necessary to have two furnaces 30, two recuperators 42 and two pumps 38 with appropriate valve connections and lines with the scrubber 56 whereby one furnace may be used for converting carbon dioxide and coke to synthesis gas while the other furnace is being preheated preparatory for the conversion of the carbon dioxide.

It will be understood also that carbon dioxide may be separated from the exhaust gases of the furnace blast if additional carbon dioxide is required for giving the proper synthesis gas. It has been also advantageous to operate the methane converter under pressure up to 35 lbs. in converting the carbon dioxide and methane into synthesis gas. Under these conditions it would be necessary to supply pumps in the lines 10 and 22 to control the pressure.

Depending upon the type of iron catalyst and the temperature used in the catalytic conversion more or less oxygenated products will be formed in the conversion by the treatment of the above described synthesis gas. At temperatures between 250° and 300° C., the largest amount of alcohols will be formed. This alcohol will be separated from the liquid products that are condensed in the condenser 104.

The preferred form of the invention having been thus described, what is claimed as new is:

1. A process of producing substantially only liquid hydrocarbons by the hydrogenation of carbon monoxide comprising: passing a synthesis gas composed of 40 to 60% carbon monoxide gas and 50 to 30% hydrogen with minor amounts of impurities under a pressure of 10 to 30 atmospheres into contact with a sintered iron catalyst at a temperature of 250° to 350° C. to produce substantially only liquid hydrocarbons and a residue gas containing a high percentage of carbon dioxide, reacting one part of the residue gas from the catalytic conversion with methane to make one synthesis gas rich in hydrogen, separately reacting another part of the residue gas with coke to make a second synthesis gas rich in carbon monoxide, and blending the two synthesis gases to provide the said synthesis gas for the hydrogenation reaction.

2. A process of producing liquid hydrocarbons by the hydrogenation of carbon monoxide comprising: reacting methane with carbon dioxide of residue gas produced in the process and a small amount of water to produce a gaseous mixture of carbon monoxide and hydrogen in substantially equal proportions, reacting carbon dioxide of residue gas produced in the process with coke at a high temperature to produce a gas composed of more than 70% carbon monoxide and 3 to 5% hydrogen, with small amounts of impurities, blending the two synthesis gases and passing the mixture through a catalyst converter in contact with the sintered iron catalyst at 250° to 350° C. and under superatmospheric pressure to produce liquid hydrocarbons and said residue gas.

3. A process of producing liquid hydrocarbons by the hydrogenation of carbon monoxide comprising: reacting methane with carbon dioxide of residue gas produced in the process and moisture to produce a gaseous mixture of carbon monoxide and hydrogen in approximately equal proportions, reacting carbon dioxide of residue gas produced in the process with coke at a high temperature to produce a gas with more than 70% carbon monoxide and approximately 3 to 5% hydrogen, blending the synthesis gases in a proportion so as to provide a ratio of CO to $H_2$ not greater than 1:0.65 and passing the mixture through a catalyst converter in contact with a sintered iron catalyst at a temperature of 250° to 350° C. and under superatmospheric pressure to produce liquid hydrocarbons and said residue gas.

4. A process of producing liquid hydrocarbons by the hydrogenation of carbon monoxide comprising: reacting methane with carbon dioxide of residue gas produced in the process to produce a synthesis gas mixture of carbon monoxide and hydrogen in approximately equal proportions, reacting carbon dioxide of residue gas produced in the process with coke at a high temperature to produce a synthesis gas of more than 70% carbon monoxide and 3 to 5% hydrogen, blending the synthesis gases in such proportion as to provide a ratio of carbon monoxide to hydrogen of not less than 1:1 and passing the mixture into contact with a sintered iron catalyst at a temperature of 300° to 350° C. under superatmospheric pressure to produce liquid hydrocarbons and said residue gas.

5. A process of producing liquid hydrocarbons by the hydrogenation of carbon monoxide comprising: reacting methane with carbon dioxide of residue gas produced in the process and moisture to produce a synthesis gas mixture of carbon monoxide and hydrogen in approximately equal proportions, reacting carbon dioxide with coke at a high temperature to produce a synthesis gas composed of more than 70% carbon monoxide and 3 to 5% of hydrogen with some impurities, blending the synthesis gases and passing the mixture into contact with a sintered iron catalyst at a temperature of 250° to 350° C. under superatmospheric pressure with a space velocity of 100 to 500 volumes of gas mixture per volume of catalyst per hour to produce liquid hydrocarbons and said residue gas.

6. A process of producing hydrocarbons by the hydrogenation of carbon monoxide comprising: catalytically reacting a portion of the residue gas containing carbon dioxide produced in the process with methane at a temperature above 1000° C. to produce a synthesis gas composed of carbon monoxide and hydrogen with a small amount of methane, reacting preheated coke with the remaining portion of said residue gas at a temperature above 1000° C. to produce a synthesis gas composed principally of carbon monoxide with a small amount of hydrogen and methane, blending the synthesis gases to provide a gas composed of carbon monoxide and hydrogen in a ratio not greater than 1:0.65 and passing the mixture into contact with an iron catalyst at a temperature of 300° to 350° C. and under a pressure of 10 to 30 atmospheres to produce liquid hydrocarbons and said residue gas.

7. A process of producing hydrocarbons by hydrogenation of carbon monoxide comprising: catalytically reacting a portion of the residue gas of the carbon monoxide hydrogenation with methane at a temperature above 100° C. and under superatmospheric pressure to produce a synthesis gas composed of carbon monoxide and hydrogen with a small amount of methane, reacting preheated coke with the remaining portion of said residue gas at a temperature above 1000° C. to produce a synthesis gas composed principally of carbon monoxide with small amounts of hydrogen and methane, blending the synthesis gases to provide a gas composed of carbon monoxide and hydrogen in a ratio not greater than 1 to 0.65 and passing the mixture through a converter in contact with a sintered iron catalyst at a temperature of 300° to 350° C. and superatmospheric pressure to produce liquid hydrocarbons and said residue gas.

EDMOND L. D'OUVILLE.

REFERENCES CITED

The following references are of record in the file of this patent:

UNITED STATES PATENTS

| Number | Name | Date |
|---|---|---|
| 1,201,850 | Mittasch et al. | Oct. 17, 1916 |
| 2,207,581 | Duffschmidt et al. | July 9, 1940 |
| 2,243,869 | Keith et al. | June 3, 1941 |
| 2,257,293 | Dreyfus | Sept. 30, 1941 |
| 2,274,064 | Howard et al. | Feb. 24, 1942 |
| 2,347,682 | Gunness | May 2, 1944 |
| 2,351,248 | Wirth et al. | June 13, 1944 |
| 2,436,938 | Scharmann et al. | Mar. 2, 1948 |

FOREIGN PATENTS

| Number | Country | Date |
|---|---|---|
| 523,221 | Great Britain | July 7, 1940 |